US010959181B2

(12) United States Patent
Chen et al.

(10) Patent No.: US 10,959,181 B2
(45) Date of Patent: Mar. 23, 2021

(54) UPLINK TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/619,655

(22) PCT Filed: Aug. 9, 2017

(86) PCT No.: PCT/CN2017/096671
§ 371 (c)(1),
(2) Date: Dec. 5, 2019

(87) PCT Pub. No.: WO2019/028709
PCT Pub. Date: Feb. 14, 2019

(65) Prior Publication Data
US 2020/0205083 A1  Jun. 25, 2020

(51) Int. Cl.
*H04W 52/14* (2009.01)
*H04W 52/34* (2009.01)

(52) U.S. Cl.
CPC ......... *H04W 52/146* (2013.01); *H04W 52/34* (2013.01)

(58) Field of Classification Search
CPC ........................... H04W 52/146; H04W 52/34
See application file for complete search history.

(56) References Cited

U.S. PATENT DOCUMENTS

| 2011/0281612 | A1* | 11/2011 | Ishii | H04W 52/32 |
| | | | | 455/522 |
| 2014/0376471 | A1* | 12/2014 | Nishio | H04W 52/367 |
| | | | | 370/329 |
| 2015/0282104 | A1* | 10/2015 | Damnjanovic | H04W 72/0446 |
| | | | | 455/522 |
| 2016/0255593 | A1* | 9/2016 | Blankenship | H04J 11/00 |
| | | | | 370/328 |

FOREIGN PATENT DOCUMENTS

| CN | 102160431 | 8/2011 |
| CN | 104081838 | 10/2014 |
| CN | 105101374 | 11/2015 |
| CN | 106165501 | 11/2016 |
| EP | 3171646 | 5/2017 |

(Continued)

OTHER PUBLICATIONS

WIPO, ISR for PCT/CN2017/096671, Apr. 27, 2018.

(Continued)

*Primary Examiner* — Md K Talukder
(74) *Attorney, Agent, or Firm* — Hodgson Russ LLP (57) ABSTRACT

An uplink transmission method includes; determining, by a terminal device according to an expected sending power of each uplink among a plurality of uplinks, an actual sending power of the each uplink; and sending, by the terminal device, signal on the each uplink using the actual sending power of the each uplink.

13 Claims, 2 Drawing Sheets

(56) References Cited

FOREIGN PATENT DOCUMENTS

| | | |
|---|---|---|
| JP | 2017521008 | 7/2017 |
| RU | 2565030 | 10/2015 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 14)," 3GPP TS 36.101, Jun. 2017, v14.4.0, 441 pages.

"3rd Generation Partnership Project; Technical Specification Group Radio Access Network; Evolved Universal Terrestrial Radio Access (E-UTRA); Physical layer procedures (Release 14)," 3GPP TS 36.213, Jun. 2017, v14.3.0, 49 pages.

NTT Docomo, "Power-control mechanisms for dual connectivity," 3GPP TSG RAN WG1 Meeting #77, R1-142264, May 2014, 8 pages.

EPO, Office Action for EP Application No. 17921381.4, dated May 6, 2020.

AT&T, "On the details of multi-TRP and multi-panel transmission," 3GPP TSG RAN WG1 NR Ad-Hoc#2, R1-1710428, Jun. 27, 2017, 4 pages.

Ericsson, "Dl multi-TRP and multi-panel transmission," 3GPP TSG-RAN WG1 #89ah-NR, R1-1711013, Jun. 27, 2017, 4 pages.

Nokia, Alcatel-Lucent Shanghai Bell, "On the maximum number of PDCCHs/PDSCHs to be supported for multi-TRP transmission," 3GPP TSG RAN1-NR#2 Ad Hoc, R1-1711288, Jun. 27, 2017, 7 pages.

KIPO, Office Action for KR Application No. 10-2019-7036004, dated Jan. 11, 2021.

ISDEC, Office Action for CA Application No. 3065405, Feb. 1, 2021.

EPO, Communication for EP Application No. 17921381.4, Feb. 2, 2021.

FSIP, Office Action for RU Application No. 2019142717/07, Dec. 15, 2020.

\* cited by examiner

FIG. 1

```
On the basis of the expected sending power of each uplink link in
a plurality of uplink links, a terminal device determines the actual     S210
           sending power of each uplink link
```

```
The terminal device uses the actual sending power of each uplink        S220
           link to send signals on each uplink link
```

UPLINK TRANSMISSION METHOD AND TERMINAL DEVICE

CROSS-REFERENCE TO RELATED APPLICATION

This application is a U.S. national phase application of International Application No. PCT/CN2017/096671, filed Aug. 9, 2017, the entire disclosure of which is incorporated herein by reference.

TECHNICAL FIELD

The present disclosure generally relates to the field of communication, and more particularly, to an uplink transmission method and a terminal device.

BACKGROUND

In discussion of the 5G system, it is determined that downlink transmission may adopt the following scheme: a plurality of transmission and reception points (TRPs) or beams may send a plurality of physical downlink control channels (PDCCHs) to a terminal device, wherein each PDCCH includes indication information of a corresponding data channel, and the plurality of PDCCHs may be considered to correspond to a plurality of downlinks.

Correspondingly, the terminal device has a plurality of uplinks, and the terminal device may send signal to a network device through the plurality of uplinks. For example, the terminal device may simultaneously send signal through the plurality of uplinks. In this case, for the terminal device, how to control sending powers of the plurality of uplinks to improve system performance is a problem urgently to be solved.

SUMMARY

Embodiments of the present disclosure provide an uplink transmission method and a terminal device, which can improve system performance.

A first aspect provides an uplink transmission method, which includes:

determining, by a terminal device according to an expected sending power of each uplink among a plurality of uplinks, an actual sending power of the each uplink; and sending, by the terminal device, signal on the each uplink using the actual sending power of the each uplink.

Therefore, according to the uplink transmission method of the embodiments of the present disclosure, the terminal device does not send uplink signal directly using the expected sending power of the each uplink, instead the terminal device determines the actual sending power of the each uplink according to the expected sending power of the each uplink, which is advantageous to ensuring that the sum of the actual sending power of the each uplink is not greater than a maximum sending power allowed for the terminal device, and thus is advantageous to improving the utilization factor of the sending power of the terminal, such that the system performance can be improved.

In combination with the first aspect, in some implementation manners of the first aspect, the determining, by a terminal device according to an expected sending power of each uplink among a plurality of uplinks, an actual sending power of the each uplink includes:

determining the actual sending power of the each uplink by the terminal device according to the expected sending power of the each uplink and a maximum sending power of the terminal device (UE), wherein the maximum sending power of the UE is indicative of a maximum sending power available for the terminal device to simultaneously send signal on the plurality of uplinks.

Optionally, the terminal device may determine a power value obtained by subtracting a corresponding adjustment amount from the expected sending power of the each uplink as the actual sending power of the each uplink. Optionally, the adjustment amount used by the each uplink may be the same or may be different. Optionally, the terminal device may also determine a power value obtained by multiplying the expected sending power of the each uplink by a corresponding adjustment factor as the actual sending power of the each uplink.

In combination with the first aspect, in some implementation manners of the first aspect, the determining the actual sending power of the each uplink by the terminal device according to the expected sending power of the each uplink and a maximum sending power of the terminal device (UE) includes:

determining, by the terminal device, a sending power obtained by multiplying the expected sending power of the each uplink by a same adjustment factor as the actual sending power of the each uplink if a sum of the expected sending power of the each uplink is greater than the maximum sending power of the UE, wherein a sum of the actual sending power of the each uplink is not greater than the maximum sending power of the UE.

When the plurality of uplinks include a first uplink and a second uplink, this implementation manner may be expressed as below: if $P1+P2 \geq P\_max$, $P1'=K*P1$, and $P2'=K*P2$, wherein $K*(P1+P2) \leq P\_max$.

In combination with the first aspect, in some implementation manners of the first aspect, the determining the actual sending power of the each uplink by the terminal device according to the expected sending power of the each uplink and a maximum sending power of the terminal device (UE) includes:

determining the actual sending power of the each uplink by the terminal device according to the expected sending power of the each uplink, the maximum sending power of the UE, and a priority of the each uplink.

Optionally, the terminal device may preferentially satisfy the expected sending power of the uplink having a higher priority. On the basis of satisfying the expected sending power of the uplink having a higher priority, if the maximum sending power of the UE is still available, corresponding sending power may be allocated to other uplinks having a lower priority, or no sending power is allocated to other uplinks having a lower priority, that is, no signal is sent using other uplinks.

In combination with the first aspect, in some implementation manners of the first aspect, the plurality of uplinks include a first uplink, the priority of the first uplink is higher than priorities of other uplinks, and the determining the actual sending power of the each uplink by the terminal device according to the expected sending power of the each uplink, the maximum sending power of the UE, and a priority of the each uplink includes:

determining an expected sending power of the first uplink as an actual sending power corresponding to the first uplink if the expected sending power of the first uplink is not greater than the maximum sending power of the UE; or determining the maximum sending power of the UE as the actual sending power corresponding to the first uplink if the expected sending power of the first uplink is greater than the maximum sending power of the UE.

In combination with the first aspect, in some implementation manners of the first aspect, the other uplinks include a second uplink, and the determining the actual sending power of the each uplink by the terminal device according to the expected sending power of the each uplink, the maximum sending power of the UE, and a priority of the each uplink includes:

determining, if the expected sending power of the first uplink is not greater than the maximum sending power of the UE, an actual sending power of the second uplink as a part or all of a first power difference or as zero, wherein the first power difference is a difference value obtained by subtracting the actual sending power of the first uplink from the maximum sending power of the UE; or determining the actual sending power of the second uplink as zero if the expected sending power of the first uplink is greater than the maximum sending power of the UE.

In general, if the priority of the first uplink is higher than that of the second uplink, this implementation manner may be expressed as below:

if P1≥P_max, P1'=P_max, P2'=0; or if P1<P_max, P1'=P1, P2'=a*(P_max−P1), or P2'=0, wherein a≤1.

In combination with the first aspect, in some implementation manners of the first aspect, the priority of the each uplink is configured by a network device or determined by the terminal device.

In combination with the first aspect, in some implementation manners of the first aspect, the priority of the each uplink is determined by the terminal device according to a preset rule.

The preset rule may be a rule agreed in a protocol. That is, both the network device and the terminal device may obtain the preset rule without information interaction, or the terminal device may also determine the priority of the each uplink according to a rule preset by the terminal device itself.

In combination with the first aspect, in some implementation manners of the first aspect, the preset rule is indicative of determining the priority of the each uplink according to at least one of:

a data size of a downlink corresponding to the uplink, a physical uplink control channel (PUCCH) format used by the uplink, a channel type used by the uplink, a signal type of transmission of the uplink, a waveform used by the uplink, or a path loss of the uplink.

In combination with the first aspect, in some implementation manners of the first aspect, the method further includes:

receiving, by the terminal device, first configuration information sent by a network device, wherein the first configuration information is used for determining the maximum sending power of the UE.

In combination with the first aspect, in some implementation manners of the first aspect, the each uplink among the plurality of uplinks respectively corresponds to a respective maximum sending power, and the determining, by a terminal device according to an expected sending power of each uplink among a plurality of uplinks, an actual sending power of the each uplink includes:

determining the actual sending power of the each uplink by the terminal device according to the expected sending power of the each uplink and the respective maximum sending power corresponding to the each uplink.

In combination with the first aspect, in some implementation manners of the first aspect, the plurality of uplinks include a first uplink, and the determining the actual sending power of the each uplink by the terminal device according to the expected sending power of the each uplink and the respective maximum sending power corresponding to the each uplink includes:

determining, by the terminal device, a first sending power as an actual sending power of the first uplink if an expected sending power of the first uplink is greater than a maximum sending power corresponding to the first uplink, wherein the first sending power is not greater than the maximum sending power corresponding to the first uplink; or determining, by the terminal device, the expected sending power of the first uplink as the actual sending power of the first uplink if the expected sending power of the first uplink is not greater than the maximum sending power corresponding to the first uplink.

In general, this implementation manner may be expressed as below: if P1>P1_max, it is determined that P1'=P, wherein P≤P1_max; or if P1≤P1_max, it is determined that P1'=P1.

In combination with the first aspect, in some implementation manners of the first aspect, the each uplink among the plurality of uplinks respectively corresponds to a respective maximum sending power and, if only a first uplink among the plurality of uplinks needs uplink transmission, the determining, by a terminal device according to an expected sending power of each uplink among a plurality of uplinks, an actual sending power of the each uplink includes:

determining, by the terminal device, a first sending power as an actual sending power of the first uplink if an expected sending power of the first uplink is greater than a maximum sending power of the UE, wherein the first sending power is not greater than the maximum sending power of the UE; or determining, by the terminal device, the expected sending power of the first uplink as the actual sending power of the first uplink if the expected sending power of the first uplink is not greater than the maximum sending power of the UE.

In this implementation manner, if P1>P_max, it is determined that P1'=P, wherein P≤P_max; or if P1≤P_max, it is determined that P1'=P1.

Optionally, if only a first uplink among the plurality of uplinks needs uplink transmission, the terminal device may also control the actual sending power of the first uplink according to the maximum sending power of the first uplink. That is, the actual sending power of the first uplink is controlled to be not greater than the maximum sending power of the first uplink, which is specifically expressed as below: if P1>P1_max, it is determined that P1'=P, wherein P≤P1_max; or if P1≤P1_max, it is determined that P1'=P1.

That is, when only one uplink needs uplink transmission, the terminal device may control the actual sending power of this uplink according to the maximum sending power of this uplink, or may also control the actual sending power of this uplink according to the maximum sending power of the UE.

In combination with the first aspect, in some implementation manners of the first aspect, the method further includes:

receiving, by the terminal device, second configuration information sent by a network device, wherein the second configuration information includes the maximum sending power corresponding to the each uplink.

In combination with the first aspect, in some implementation manners of the first aspect, the sum of the maximum sending power corresponding to the each uplink is less than or equal to the maximum sending power of the UE.

In combination with the first aspect, in some implementation manners of the first aspect, the each uplink respectively corresponds to a respective maximum static power, and the determining, by a terminal device according to an expected sending power of each uplink among a plurality of uplinks, an actual sending power of the each uplink includes:

determining the actual sending power of the each uplink according to the expected sending power of the each uplink and the respective maximum static power corresponding to the each uplink.

In combination with the first aspect, in some implementation manners of the first aspect, a sum of the maximum static power corresponding to the each uplink is less than the maximum sending power of the UE, a dynamic power adjustment amount is obtained by subtracting the sum of the maximum static power corresponding to the each uplink from the maximum sending power of the UE, and the dynamic power adjustment amount is used for dynamically adjusting sending powers of the plurality of uplinks.

Therefore, in the uplink transmission method of the embodiments of the present disclosure, the terminal device may perform semi-static adjustment on the sending power of the each uplink according to the maximum static power and the dynamic power adjustment amount corresponding to the each uplink.

Optionally, the actual sending power of the each uplink is not allowed to be greater than the maximum sending power of the each uplink, but the actual sending power of the each uplink may be greater than the maximum static power of the each uplink.

In combination with the first aspect, in some implementation manners of the first aspect, the plurality of uplinks include a first uplink, and the determining the actual sending power of the each uplink according to the expected sending power of the each uplink and the maximum static power corresponding to the each uplink includes:

determining, by the terminal device, a first sending power as an actual sending power of the first uplink if an expected sending power of the first uplink is greater than a maximum static power corresponding to the first uplink, wherein the first sending power is equal to a sum of the maximum static power corresponding to the first uplink and a first adjustment amount, and the first adjustment amount is a part or all of the dynamic power adjustment amount.

That is, if the expected sending power of the first uplink is greater than the maximum static power corresponding to the first uplink, the terminal device may select to allocate a part or all of the dynamic power adjustment amount to the first uplink. Optionally, if the expected sending power of the first uplink is not greater than the maximum static power corresponding to the first uplink, the terminal device may determine the expected sending power of the first uplink as the actual sending power of the first uplink.

In general, if P1>P1_static, P1'=P1_static+ΔP1, wherein ΔP1 represents the aforementioned first adjustment amount, ΔP1=a*ΔP, a≤1; or if P1≤P1_static, P1'=P1.

In combination with the first aspect, in some implementation manners of the first aspect, the determining the actual sending power of the each uplink according to the expected sending power of the each uplink and the maximum static power corresponding to the each uplink includes:

determining, by the terminal device, the actual sending power of the each uplink according to the expected sending power of the each uplink, the respective maximum static power corresponding to the each uplink, and a priority of the each uplink.

In this implementation, if all the expected sending powers of the plurality of uplinks are greater than the corresponding static sending power, the terminal device may further determine the actual sending powers of the plurality of uplinks according to the priorities of the plurality of uplinks. For example, the dynamic power adjustment amount may be sequentially allocated according to the priorities of the plurality of uplinks.

In combination with the first aspect, in some implementation manners of the first aspect, the plurality of uplinks include a first uplink and a second uplink, and the determining, by the terminal device, the actual sending power of the each uplink according to the expected sending power of the each uplink, the respective maximum static power corresponding to the each uplink, and a priority of the each uplink includes:

determining, by the terminal device, an actual sending power of the first uplink and an actual sending power of the second uplink according to an expected sending power of the first uplink, an expected sending power of the second uplink, a maximum static power corresponding to the first uplink, a maximum static power corresponding to the second uplink, a priority of the first uplink and a priority of the second uplink, if the expected sending power of the first uplink is greater than the maximum static power corresponding to the first uplink and the expected sending power of the second uplink is greater than the maximum static power corresponding to the second uplink.

In combination with the first aspect, in some implementation manners of the first aspect, the determining, by the terminal device, an actual sending power of the first uplink and an actual sending power of the second uplink according to an expected sending power of the first uplink, an expected sending power of the second uplink, a maximum static power corresponding to the first uplink, a maximum static power corresponding to the second uplink, and a priority of the first uplink and a priority of the second uplink includes:

determining a first sending power as the actual sending power of the first uplink and determining a second sending power as the actual sending power of the second uplink if the priority of the first uplink is higher than the priority of the second uplink, wherein the first sending power is equal to a sum of the maximum static power corresponding to the first uplink and a first adjustment amount, the first adjustment amount is a part or all of the dynamic adjustment amount, and the second sending power is equal to a part or all of a first power difference obtained by subtracting the first sending power from the maximum sending power of the UE.

In combination with the first aspect, in some implementation manners of the first aspect, the method further includes:

determining a part of the dynamic adjustment amount as the first adjustment amount if the expected sending power of the first uplink is less than a second power difference, wherein the second power difference is a power difference obtained by subtracting, from the maximum sending power of the UE, a sum of maximum static powers corresponding to uplinks among the plurality of uplinks other than the first uplink; or determining all of the dynamic adjustment amount as the first adjustment amount if the expected sending power of the first uplink is not less than the second power difference.

That is, if $P1<P\_max-P2\_static$, $\Delta P1=a*\Delta P$, wherein $a<1$; or if $P1\geq P\_max-P2\_static$, $\Delta P1=\Delta P$.

In combination with the first aspect, in some implementation manners of the first aspect, the method further includes:

receiving, by the terminal device, third configuration information sent by a network device, wherein the third configuration information includes the maximum static power corresponding to the each uplink.

In combination with the first aspect, in some implementation manners of the first aspect, carrier waves corresponding to the plurality of uplinks at least partially overlap in a frequency domain.

A second aspect provides a terminal device, which is configured to perform the method in the first aspect or in any possible implementation manner of the first aspect. Specifically, the terminal device includes a unit configured to perform the method in the first aspect or in any possible implementation manner of the first aspect.

A third aspect provides a terminal device, which includes: a memory, a processor, an input interface, and an output interface. The memory, the processor, the input interface, and the output interface are connected via a bus system. The memory is configured to store instructions, and the processor is configured to execute the instructions stored in the memory to perform the method in the first aspect or in any possible implementation manner of the first aspect.

A fourth aspect provides a computer storage medium, which is configured to store computer software instructions, including programs designed for executing the above aspects, to perform the method in the first aspect or in any possible implementation manner of the first aspect.

A fifth aspect provides a computer program product including instructions. When the computer program product runs on a computer, the computer is caused to perform the method in the first aspect or in any alternative implementation manner of the first aspect.

DETAILED DESCRIPTION

Technical solutions in the embodiments of the present disclosure will be described below with reference to the accompanying drawings in the embodiments of the present disclosure.

It is to be understood that terms "system" and "network" herein are often used interchangeably herein. It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, or a future 5G system, etc.

Figure 1:
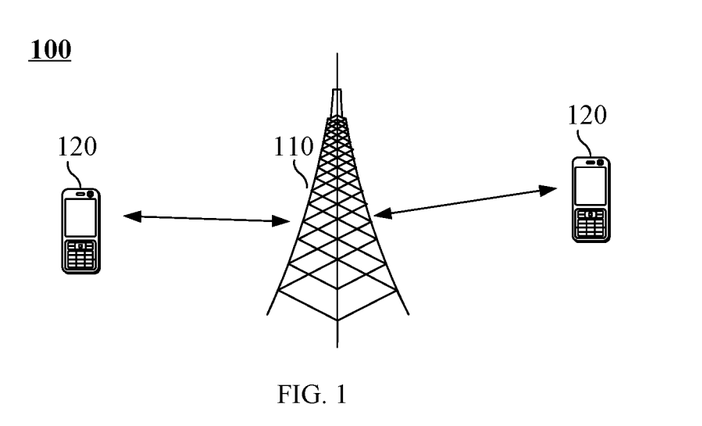
FIG. 1 is a schematic diagram of a communication system according to an embodiment of the present disclosure.

FIG. 1 illustrates a wireless communication system 100 used in an embodiment of the present disclosure. The wireless communication system 100 may include a network device 110. The network device 110 may be a device communicating with a terminal device. The network device 110 may provide communication coverage for a particular geographic region, and may communicate with a terminal device (such as UE) positioned within the coverage region. Optionally, the network device 110 may be a Base Transceiver Station (BTS) in a GSM system or a CDMA system, a NodeB (NB) in a WCDMA system, an Evolutional Node B (eNB or eNodeB) in a LTE system, an LTE Time Division Duplex (TDD) system, or a wireless controller in Cloud Radio Access Network (CRAN), or a relay station, an access point, a vehicle-mounted device, a wearable device, a network side device in a future 5G network, or a network device in a future evolutional Public Land Mobile Network (PLMN).

The wireless communication system 100 further includes at least one terminal device 120 positioned within the coverage range of the network device 110. The terminal device 120 may be either mobile or fixed. Optionally, the terminal device 120 may refer to an access terminal, user equipment (UE), a subscriber unit, a subscriber station, a mobile station, a remote station, a remote terminal, a mobile device, a user terminal, a terminal, a wireless communication device, a user agent, or a user apparatus. The terminal device may be a cellular phone, a cordless phone, an SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in the future 5G network, or a terminal device in the future evolutional PLMN, etc.

Optionally, device to device (D2D) communication may be performed between the terminal devices 120.

Optionally, the 5G system or network may also be referred to as a new radio (NR) system or network.

FIG. 1 schematically illustrates one network device and two terminal devices. Optionally, the wireless communication system 100 may include a plurality of network devices, and each of the network devices may include other numbers of terminal devices within its coverage range, which is not limited in the embodiments of the present disclosure.

Optionally, the wireless communication system 100 may further include other network entities, such as a network controller, a mobility management entity, and the like, which is not limited in the embodiments of the present disclosure.

In the embodiments of the present disclosure, the terminal device may receive a plurality of PDCCHs from a plurality of TRPs or beams, wherein the plurality of TRPs or beams may be one of the following cases:

1. the plurality of TRPs or beams belong to the same cell, and the connection between the plurality of TRPs is ideal, that is, information interaction may be performed quickly;

2. the plurality of TRPs or beams belong to the same cell, and the connection between the plurality of TRPs is not ideal, that is, information interaction may be performed between the TRPs at a slower speed;

3. the plurality of TRPs or beams belong to different cells, and the connection between the plurality of TRPs is ideal; and 4. the plurality of TRPs or beams belong to different cells, and the connection between the plurality of TRPs is not ideal.

Figure 2:
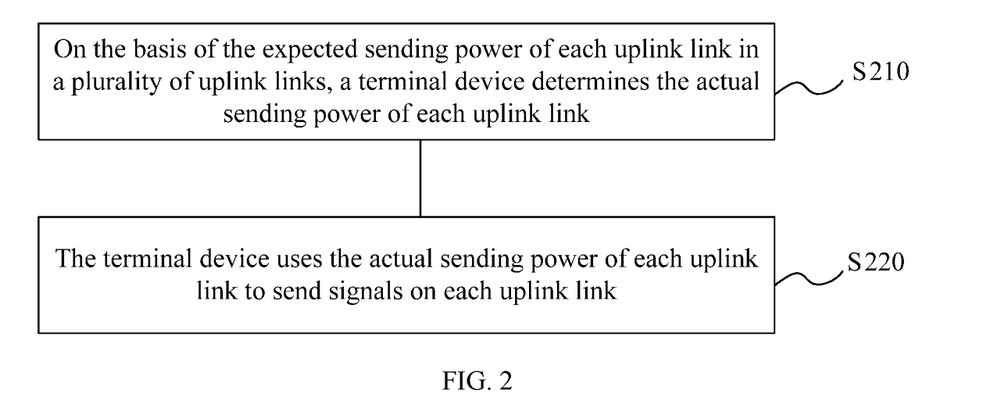
FIG. 2 is a schematic flowchart of an uplink transmission method according to an embodiment of the present disclosure.

FIG. 2 schematically illustrates an uplink transmission method 200 according to an embodiment of the present disclosure. This method 200 may be used in the above wireless communication system 100, but the embodiment of the present disclosure is not limited thereto.

As shown in FIG. 2, this method 200 includes following steps:

S210: determining, by a terminal device according to an expected sending power of each uplink among a plurality of uplinks, an actual sending power of the each uplink; and S220: sending signal on the each uplink by the terminal device using the actual sending power of the each uplink.

It is to be noted that in the embodiments of the present disclosure, each uplink includes a control channel and a corresponding data channel. That is, each uplink may be configured to transmit control signal and uplink data.

Optionally, the signal transmitted by the terminal device on the plurality of uplinks may include at least one of:

Acknowledgement/Negative ACKnowledgement (ACK/NACK) corresponding to downlink transmission, channel state information (CSI) corresponding to a downlink channel, uplink data, or sounding reference signal (SRS).

Optionally, in the embodiments of the present disclosure, the expected sending power of the each uplink may be determined according to an existing rule. That is, the expected sending power of the each uplink is an estimated sending power of the each uplink. However, the estimated expected sending power of the each uplink may likely be greater than the maximum sending power allowed for the each uplink, or the sum of the expected sending power of the each uplink may likely be greater than the maximum sending power (which may also be referred to as the maximum sending power of the UE, denoted as P_max) allowed for the terminal device. When the above case occurs, the terminal device cannot directly transmit the signal on the each uplink using the expected sending power determined for the each uplink. Therefore, the terminal device needs to perform power control on the sending power of the each uplink. For example, the terminal device may determine the actual sending power of the each uplink according to the expected sending power of the each uplink. When the sum of the actual sending power of the each uplink is not greater than the maximum sending power of the UE, the terminal device sends the signal on the each uplink using the actual sending power of the each uplink.

Therefore, according to the uplink transmission method of the embodiments of the present disclosure, the terminal device does not send uplink signal directly using the expected sending power of the each uplink, instead the terminal device determines the actual sending power of the each uplink according to the expected sending power of the each uplink, which is advantageous to ensuring that the sum of the actual sending power of the each uplink is not greater than a maximum sending power allowed for the terminal device, and thus is advantageous to improving the utilization factor of the sending power of the terminal, such that the system performance can be improved.

It is to be noted that in the embodiments of the present disclosure, the maximum sending power allowed for the terminal device or the maximum sending power of the UE refers to a maximum sending power available for the terminal device to simultaneously send signal on the plurality of uplinks. That is, the sum of the actual sending power of the each uplink is not allowed to be greater than the maximum sending power of the UE, wherein the maximum sending power of the UE is the sum of the maximum sending power allowed for the each uplink.

For example, the plurality of uplinks include a first uplink and a second uplink, which respectively correspond to an expected sending power P1 and an expected sending power P2. If P1+P2>P_max, i.e., if the sum of the expected sending power of the first uplink and the expected sending power of the second uplink is greater than the maximum sending power of the UE, the sending power of the first uplink and the sending power of the second uplink need to be controlled, and the actual sending power of the first uplink and the actual sending power of the second uplink are determined and denoted as P1' and P2', respectively. After the power control, the sum of the actual sending power of the each uplink satisfies P1'+P2'≤P_max.

Optionally, the terminal device may determine a sending power obtained by multiplying the expected sending power of the first uplink and the expected sending power of the second uplink by the same adjustment factor as the actual sending power of the first uplink and the actual sending power of the second uplink.

Optionally, if the expected sending power of the first uplink is less than the maximum sending power of the UE, i.e., if P1<P_max, the expected sending power of the first uplink may be determined as the actual sending power value of the first uplink, i.e., P1'=P1. The actual sending power value of the second uplink is a difference value obtained by subtracting the actual sending power of the first uplink from the maximum sending power of the UE, i.e., P2'=P_max-P1'.

Optionally, if the expected sending power of the first uplink is greater than or equal to the maximum sending power of the UE, i.e., P1≥P_max, at this moment, the maximum sending power of the UE may be determined as the actual sending power of the first uplink, and the actual sending power of the second uplink is zero, i.e., P1'=P_max, and P2'=0.

Optionally, in some possible embodiments, S210 may include:

determining the actual sending power of the each uplink by the terminal device according to the expected sending power of the each uplink and a maximum sending power of the terminal device (UE), wherein the maximum sending power of the UE is indicative of a maximum sending power available for the terminal device to simultaneously send signal on the plurality of uplinks.

For example, the terminal device may adjust the expected sending power of the each uplink, such that the sum of the actual sending power of the each uplink is not greater than the maximum sending power of the UE. By way of example but not limitation, the terminal device may determine a power value obtained by subtracting a corresponding adjustment amount from the expected sending power of the each uplink as the actual sending power of the each uplink. Optionally, the adjustment amount used by the each uplink may be the same or may be different. Optionally, the terminal device may also determine a power value obtained by multiplying the expected sending power of the each uplink by a corresponding adjustment factor as the actual sending power of the each uplink.

For example, the plurality of uplinks include a first uplink and a second uplink, the expected sending power P1 of the first uplink and the expected sending power P2 of the second uplink are 10 and 20, respectively, and the maximum sending power P_max of the UE is 20. The power control is required because P1+P2>P_max. Optionally, the terminal device may determine a power value obtained by subtracting a first adjustment amount (denoted as ΔP1) from the expected sending power of the first uplink as the actual sending power P1' of the first uplink, and may determine a power value obtained by subtracting a second adjustment amount (denoted as ΔP2) from the expected sending power of the second uplink as the actual sending power P2' of the second uplink. By way of example but not limitation, if ΔP1=5 and ΔP2=5, P1'=P1-ΔP1=5, and P2'=P2-ΔP2=15; or if ΔP1=1 and ΔP2=10, P1'=P1-ΔP1=9, and P2'=P2-ΔP2=10, and so on.

Optionally, the expected sending power of the first uplink may be multiplied by a first adjustment factor K1, and the expected sending power of the second uplink may be multiplied by a second adjustment factor K2. Optionally, the first adjustment factor may be the same as or may be different from the second adjustment factor. Continuing referring to the above example, if K1=½ and K2=½, P1'=K1*P1=5, and P2'=K2*P2=10; if K1=1 and K2=½, P1'=K1*P1=10 and P2'=K2*P2=10, and so on.

Embodiment 1

Optionally, in a specific embodiment, the determining the actual sending power of the each uplink by the terminal device according to the expected sending power of the each uplink and the maximum sending power of the UE includes:

determining, by the terminal device, a sending power obtained by multiplying the expected sending power of the each uplink by a same adjustment factor as the actual sending power of the each uplink if a sum of the expected sending power of the each uplink is greater than the maximum sending power of the UE, wherein sum of the actual sending power of the each uplink is not greater than the maximum sending power of the UE.

An introduction is made below taking an example where the plurality of uplinks include a first uplink and a second uplink, but no limitation should be imposed on the embodiments of the present disclosure. More uplinks may be included in the embodiments of the present disclosure, for example, a third uplink and a fourth uplink, etc. When more uplinks are included, the uplink transmission method in the embodiments of the present disclosure may be adaptively adjusted, and corresponding details are not described again hereinafter.

Specifically, if the plurality of uplinks include the first uplink and the second uplink, which respectively correspond to an expected sending power P1 and an expected sending power P2. If P1+P2>P_max, power control is required. Optionally, the expected sending powers of the plurality of uplinks may be adjusted using the same adjustment factor K, such that the sum of the adjusted sending powers of the uplinks is not greater than the maximum sending power of the UE, i.e., K*(P1+P2)≤P_max is satisfied. For example, P1=40, P2=60, and P_max=80, thus K may be equal to ⅘ or a smaller value. If K=⅘, the actual sending power P1' of the first uplink is equal to 32, i.e., P1'=32, and the actual sending power P2' of the second uplink is equal to 48, i.e., P2'=48.

In general, if the plurality of uplinks include a first uplink and a second uplink, the Embodiment 1 may be expressed as below:

if P1+P2≥P_max, P1'=K*P1, and P2'=K*P2, wherein K*(P1+P2)≤P_max.

Embodiment 2

Optionally, in a possible embodiment, the determining the actual sending power of the each uplink by the terminal device according to the expected sending power of the each uplink and the maximum sending power of the UE includes:

determining the actual sending power of the each uplink by the terminal device according to the expected sending power of the each uplink, the maximum sending power of the UE, and a priority of the each uplink.

In Embodiment 2, the plurality of uplinks may have a priority order. When performing power control, the terminal device may determine the actual sending power of the each uplink according to the priority order of the plurality of uplinks. For example, the terminal device may preferentially satisfy the expected sending power of the uplink having a higher priority. On the basis of satisfying the expected sending power of the uplink having a higher priority, if the maximum sending power of the UE is still available, corresponding sending power may be allocated to other uplinks having a lower priority, or no sending power is allocated to other uplinks having a lower priority, that is, no signal is sent using other uplinks.

Optionally, in a specific embodiment of Embodiment 2, the plurality of uplinks include a first uplink, the priority of the first uplink is higher than priorities of other uplinks, and the determining the actual sending power of the each uplink by the terminal device according to the expected sending power of the each uplink, the maximum sending power of the UE, and a priority of the each uplink includes:

determining an expected sending power of the first uplink as an actual sending power corresponding to the first uplink if the expected sending power of the first uplink is not greater than the maximum sending power of the UE; or determining the maximum sending power of the UE as the actual sending power corresponding to the first uplink if the expected sending power of the first uplink is greater than the maximum sending power of the UE.

In this embodiment, the priority of the first uplink is higher than the priorities of other uplinks, in this case, the terminal device may preferentially allocate a sending power to the first uplink. Optionally, if P1≥P_max, that is, if the expected sending power of the first uplink is greater than or equal to the maximum sending power of the UE, or even if the maximum sending power of the UE is allocated to the first uplink, the expected sending power of the first uplink is barely satisfied or even not satisfied yet. In this case, the terminal device may determine the maximum sending power of the UE as the actual sending power of the first uplink, i.e., P1'=P_max. Optionally, if P1<P_max, the terminal device may determine the expected sending power of the first uplink as the actual sending power of the first uplink, i.e., P1'=P1. Because P1<P_max, after the sending power is allocated to the first uplink, there is still residual maximum sending power of the UE. In this case, the terminal device may allocate the residual sending power to other uplinks having a lower priority, or no residual sending power is allocated to other uplinks having a lower priority, that is, no signal is sent using other uplinks having a lower priority.

Continuing referring to the above embodiment, the other uplinks include a second uplink, and the determining the actual sending power of the each uplink by the terminal device according to the expected sending power of the each uplink, the maximum sending power of the UE, and a priority of the each uplink includes:

determining a part or all of a first power difference as an actual sending power of the second uplink, or determining the actual sending power of the second uplink as zero if the expected sending power of the first uplink is not greater than the maximum sending power of the UE, wherein the first power difference is a difference value obtained by subtracting the actual sending power of the first uplink from the maximum sending power of the UE; or determining the actual sending power of the second uplink as zero if the expected sending power of the first uplink is greater than the maximum sending power of the UE.

In this embodiment, the priority of the first uplink is higher than that of the second uplink. As can be known from the above description, the terminal device may preferentially allocate sending power to the first uplink. If there is still residual sending power of the UE after the sending power is allocated to the first uplink (i.e., the sending power is not completely allocated), the terminal device may select to allocate a part or all of the residual sending power to the second uplink, or may select not to allocate sending power to the second uplink, i.e., no signal is sent using the second uplink. Optionally, if there is no residual sending power of the UE after the sending power is allocated to the first uplink, the terminal device may determine the actual sending power of the second uplink as zero.

In general, if the priority of the first uplink is higher than that of the second uplink, this embodiment may be expressed as below:

if P1≥P_max, P1'=P_max, P2'=0; or if P1<P_max, P1'=P1, P2'=a*(P_max−P1), or P2'=0, wherein a≤1.

Optionally, in some embodiments of the present disclosure, the priority of the each uplink is configured by a network device or determined by the terminal device.

For example, the network device may configure the priority of the each uplink by sending a first message to the terminal device. Optionally, the first message may be semi-static signaling such as a radio resource control (RRC) message, or dynamic signaling such as downlink control information (DCI). Optionally, the priority of the each uplink may also be determined by the terminal device itself. For example, the terminal device may determine the priority of an uplink according to the type of signal transmitted by the uplink, or may determine the priority of an uplink according to a PUCCH format used by the link, and so on.

Optionally, the priority of the each uplink may also be determined by the terminal device according to a preset rule, wherein the preset rule may be agreed in a protocol. That is, both the terminal device and the network device may obtain the preset rule without information interaction. In other words, it may be unnecessary for the network device to configure, for the terminal device, the priority of the each uplink, and the terminal device directly determines the priority of the each uplink according to the preset rule.

Optionally, in some embodiments of the present disclosure, the preset rule may be indicative of determining the priority of the each uplink according to at least one of:

a data size of a downlink corresponding to the uplink, a physical uplink control channel (PUCCH) format used by the uplink, a channel type used by the uplink, a signal type of transmission of the uplink, a waveform used by the uplink, or a path loss of the uplink.

Specifically, the terminal device may determine the priority of the each uplink according to the data size of the downlink corresponding to the uplink. For example, it may be set that the priority of the corresponding uplink is higher when the data size of the downlink is larger, or it may be set that the priority of the corresponding uplink is higher when the data size of the downlink is smaller.

Optionally, the terminal device may also determine the priority of the each uplink according to the PUCCH format used by the uplink. For example, it may be set that different PUCCH formats correspond to different priorities. That is, the PUCCH format may be indicative of the priority order of the corresponding uplink. For example, it may be set that the uplink using the PUCCH format 2 corresponds to the highest priority, the uplink using the PUCCH format 2a corresponds to the second-highest priority, and the uplink using the PUCCH format 2b corresponds to the lowest priority.

Optionally, the terminal device may also determine the priority of the each uplink according to types of signal transmitted by the plurality of uplinks. For example, the terminal device may determine that the uplink used for transmitting the ACK/NACK has the highest priority and the uplink used for transmitting the uplink data has the lowest priority, or the terminal device may determine that the uplink used for transmitting the CSI has the highest priority and the uplink used for transmitting the uplink data has the lowest priority, and so on.

Optionally, the terminal device may also determine the priority of the each uplink according to waveforms used by the plurality of uplinks. For example, the waveforms used by the uplinks may include waveforms formed by using Orthogonal Frequency Division Multiplexing (OFDM) technology or DFT-spread OFDM (DFT-s-OFDM) technology, wherein for the same maximum sending power, the waveform formed by using the DFT-s-OFDM technology has a larger coverage range than the waveform formed by using the OFDM technology. Optionally, the priority corresponding to the OFDM may be set higher than that corresponding to the DFT-s-OFDM. Accordingly, the priority of the uplink using the OFDM technology is higher than the priority of the uplink using the DFT-s-OFDM technology. That is, sending power is preferentially allocated to the uplink using the OFDM technology, such that the uplink with smaller path loss can transmit a plurality of data streams. Optionally, the priority corresponding to the DFT-s-OFDM may be set higher than that corresponding to the OFDM. Accordingly, the priority of the uplink using the DFT-s-OFDM technology is higher than the priority of the uplink using the OFDM technology. That is, sending power is preferentially allocated to the uplink using the DFT-s-OFDM technology, such that the uplink with larger path loss can maintain transmission of basic services. That is, the terminal device may determine that the uplinks using the OFDM technology and the DFT-S-OFDM technology may correspond to different priorities respectively.

Optionally, the terminal device may also determine the priority of the each uplink according to path losses of the plurality of uplinks, wherein the path loss of an uplink may be indicative of superiority or inferiority in the link quality of the uplink. Specifically, lower path loss may be considered to be better link quality, and higher path loss may be considered to be poorer link quality. By way of example but not limitation, it may be set that an uplink having a lower path loss may correspond to a higher priority, and an uplink with a higher path loss may correspond to a lower priority. Thus, sending power may be preferentially allocated to the uplink having better link quality, such that the utilization of the sending power of the terminal device can be increased, and system performance can be improved.

Optionally, in some embodiments of the present disclosure, the method 200 may further include:

receiving, by the terminal device, first configuration information sent by a network device, wherein the first configuration information is used for determining the maximum sending power of the UE.

That is, the network device may send the first configuration information to the terminal device, wherein the first configuration information may be used for determining the maximum sending power of the UE, i.e., P_max. Optionally, the first configuration may directly indicate the maximum sending power of the UE, or the first configuration information may be indicative of other information. The terminal device may determine the maximum sending power of the UE according to the first configuration information. The specific form of the first configuration information is not specifically limited in the embodiments of the present disclosure, as long as the maximum sending power of the UE can be determined according to the first configuration information.

Optionally, the network device may carry the first configuration information via an RRC message, or may include the first configuration information via DCI, and the manner of sending the first configuration information is not limited in the embodiments of the present disclosure.

Embodiment 3

Optionally, in a possible embodiment, the each uplink among the plurality of uplinks respectively corresponds to a corresponding maximum sending power, and the determining, by a terminal device according to an expected sending power of each uplink among a plurality of uplinks, an actual sending power of the each uplink includes:

determining the actual sending power of the each uplink by the terminal device according to the expected sending power of the each uplink and the maximum sending power corresponding to the each uplink.

In this embodiment, the each uplink respectively corresponds to the corresponding maximum sending power, and the sum of the maximum sending power of the each uplink is equal to the maximum sending power of the UE. If the plurality of uplinks include the first uplink and the second uplink, P_max=P1_max+P2_max, where P1_max represents the maximum sending power of the first uplink, and P2_max represents the maximum sending power of the second uplink.

Optionally, in a specific embodiment of Embodiment 3, the plurality of uplinks include a first uplink, and the determining the actual sending power of the each uplink by the terminal device according to the expected sending power of the each uplink and the maximum sending power corresponding to the each uplink includes:

determining, by the terminal device, a first sending power as an actual sending power of the first uplink if an expected sending power of the first uplink is greater than a maximum sending power corresponding to the first uplink, wherein the first sending power is not greater than the maximum sending power corresponding to the first uplink; or determining, by the terminal device, the expected sending power of the first uplink as the actual sending power of the first uplink if the expected sending power of the first uplink is not greater than the maximum sending power corresponding to the first uplink.

In this embodiment, the actual sending power of the each uplink is not allowed to be greater than the maximum sending power of the each uplink. If the expected sending power of the first uplink is greater than the maximum sending power of the first uplink, a first sending power not greater than the maximum sending power of the first uplink is determined as the actual sending power of the first uplink. That is, the first sending power may be equal to or less than the maximum sending power of the first uplink. Optionally, the expected sending power of the first uplink is determined as the actual sending power of the first uplink if the expected sending power of the first uplink is less than or equal to the maximum sending power of the first uplink.

That is, if $P1>P1\_max$, it is determined that $P1'=P$, wherein $P \leq P1\_max$; or if $P1 \leq P1\_max$, it is determined that $P1'=P1$.

In particular, if only a first uplink among the plurality of uplinks needs uplink transmission, S210 may further include:

determining, by the terminal device, a first sending power as an actual sending power of the first uplink if an expected sending power of the first uplink is greater than a maximum sending power of the UE, wherein the first sending power is not greater than the maximum sending power of the UE; or determining the expected sending power of the first uplink as the actual sending power of the first uplink if the expected sending power of the first uplink is not greater than the maximum sending power of the UE.

That is, when only a first uplink among the plurality of uplinks needs uplink transmission, the terminal device may control the actual sending power of the first uplink according to the maximum sending power of the UE. That is, the actual sending power of the first uplink is controlled to be not greater than the maximum sending power of the UE, which is specifically expressed as below: if $P1>P\_max$, $P1'=P$, wherein $P \leq P\_max$; or if $P1 \leq P\_max$, $P1'=P1$.

Optionally, if only a first uplink among the plurality of uplinks needs uplink transmission, similar to the foregoing embodiment, the terminal device may also control the actual sending power of the first uplink according to the maximum sending power of the first uplink. That is, the actual sending power of the first uplink is controlled to be not greater than the maximum sending power of the first uplink, which is specifically expressed as below: if $P1>P1\_max$, $P1'=P$, wherein $P \leq P1\_max$; or if $P1 \leq P1\_max$, $P1'=P1$.

That is, when only one uplink needs uplink transmission, the terminal device may control the actual sending power of this uplink according to the maximum sending power of this uplink, or may also control the actual sending power of this uplink according to the maximum sending power of the UE.

Optionally, the method 200 further includes:

receiving, by the terminal device, second configuration information sent by a network device, wherein the second configuration information includes the maximum sending power corresponding to the each uplink.

That is, the network device may send the second configuration information to the terminal device, wherein the second configuration information may be indicative of the maximum sending power corresponding to the each uplink, i.e., P1_max and P2 max, etc.

Optionally, the network device may carry the second configuration information via an RRC message, or may include the second configuration information via DCI, and the manner of sending the second configuration information is not limited in the embodiments of the present disclosure.

Embodiment 4

Optionally, in some possible embodiments, the each uplink respectively corresponds to a corresponding maximum static power, and the determining, by a terminal device according to an expected sending power of each uplink among a plurality of uplinks, an actual sending power of the each uplink includes:

determining the actual sending power of the each uplink according to the expected sending power of the each uplink and the maximum static power corresponding to the each uplink.

In this Embodiment 4, the each uplink respectively corresponds to a corresponding maximum static power, and different from the foregoing embodiment, the sum of the maximum static power corresponding to the each uplink is less than the maximum sending power of the UE. That is, there is still residue after subtracting the sum of the maximum static power corresponding to the each uplink from the maximum sending power of the UE, and the residue is referred to as a dynamic power adjustment amount (denoted as $\Delta P$), wherein the dynamic power adjustment amount may be used for dynamically adjusting the sending powers of the plurality of uplinks. That is, semi-static adjustment of the sending power of the each uplink may be implemented in this embodiment.

It is to be noted that in the foregoing embodiment, the actual sending power of the each uplink is not allowed to be greater than the maximum sending power of the each uplink (except in exceptional circumstances). Different from the foregoing embodiment, in the Embodiment 4, the actual sending power of the each uplink may be greater than the maximum static power of the each uplink, but the sum of the actual sending power of the each uplink is not allowed to be greater than the maximum sending power of the UE.

In a specific embodiment of Embodiment 4, the plurality of uplinks include a first uplink, and the determining the actual sending power of the each uplink according to the expected sending power of the each uplink and the maximum static power corresponding to the each uplink includes:

determining, by the terminal device, a first sending power as an actual sending power of the first uplink if an expected sending power of the first uplink is greater than a maximum static power corresponding to the first uplink, wherein the first sending power is equal to the maximum static power corresponding to the first uplink plus a first adjustment amount, and the first adjustment amount is a part or all of the dynamic power adjustment amount.

That is, if the expected sending power of the first uplink is greater than the maximum static power corresponding to the first uplink, the terminal device may select to allocate a part or all of the dynamic power adjustment amount to the first uplink. Optionally, if the expected sending power of the first uplink is not greater than the maximum static power corresponding to the first uplink, the terminal device may determine the expected sending power of the first uplink as the actual sending power of the first uplink.

That is, if $P1>P1\_static$, $P1'=P1\_static+\Delta P1$, wherein $\Delta P1$ represents the aforementioned first adjustment amount, $\Delta P1=a*\Delta P$, $a\leq 1$; or if $P1\leq P1\_static$, $P1'=P1$.

Optionally, in a specific embodiment of Embodiment 4, the method 200 further includes:

determining a part of the dynamic adjustment amount as the first adjustment amount if the expected sending power of the first uplink is less than a second power difference, wherein the second power difference is a power difference obtained by subtracting, from the maximum sending power of the UE, sum of maximum static powers corresponding to other uplinks among the plurality of uplinks excluding the first uplink; or determining all of the dynamic adjustment amount as the first adjustment amount if the expected sending power of the first uplink is not less than the second power difference.

That is, if all of the dynamic power adjustment amount is allocated to the first uplink, the actual sending power of the first uplink is greater than the expected sending power of the first uplink, In this case, a part of the dynamic power adjustment amount may be allocated to the first uplink; or, if all of the dynamic power adjustment amount is allocated to the first uplink, the actual sending power of the first uplink is still less than the expected sending power of the first uplink. In this case, all of the dynamic power adjustment amount may be allocated to the first uplink.

That is, if $P1<P\_max-P2\_static$, $\Delta P1=a*\Delta P$, wherein $a<1$; or if $P1\geq P\_max-P2\_static$, $\Delta P1=\Delta P$.

Optionally, in an implementation of Embodiment 4, the determining the actual sending power of the each uplink according to the expected sending power of the each uplink and the maximum static power corresponding to the each uplink includes:

determining the actual sending power of the each uplink by the terminal device according to the expected sending power of the each uplink, the maximum static power corresponding to the each uplink, and a priority of the each uplink.

If all the expected sending powers of the plurality of uplinks are greater than the corresponding static sending power, the terminal device may further determine the actual sending powers of the plurality of uplinks according to the priorities of the plurality of uplinks. For example, the dynamic power adjustment amount may be sequentially allocated according to the priorities of the plurality of uplinks.

Similar to the foregoing embodiment, the priority of the each uplink is configured by a network device or determined by the terminal device, which is not described in detail herein.

Optionally, in an implementation of Embodiment 4, the plurality of uplinks include a first uplink and a second uplink, and the determining the actual sending power of the each uplink by the terminal device according to the expected sending power of the each uplink, the maximum static power corresponding to the each uplink, and a priority of the each uplink includes:

determining an actual sending power of the first uplink and an actual sending power of the second uplink by the terminal device according to an expected sending power of the first uplink, an expected sending power of the second uplink, a maximum static power corresponding to the first uplink, a maximum static power corresponding to the second uplink, and a priority of the first uplink and a priority of the second uplink if the expected sending power of the first uplink is greater than the maximum static power corresponding to the first uplink and the expected sending power of the second uplink being greater than the maximum static power corresponding to the second uplink.

That is, the terminal device may further determine an actual sending power of the first uplink and an actual sending power of the second uplink according to a priority of the first uplink and a priority of the second uplink when the expected sending power of the first uplink is greater than the maximum static power corresponding to the first uplink and the expected sending power of the second uplink is greater than the maximum static power corresponding to the second uplink. For example, the terminal device may preferentially allocate a part or all of the dynamic adjustment amount to an uplink having a higher priority, and then allocate the residual sending power to an uplink having a lower priority on the basis of satisfying the uplink having a higher priority.

Optionally, in a specific embodiment of Embodiment 4, the determining an actual sending power of the first uplink and an actual sending power of the second uplink by the terminal device according to an expected sending power of the first uplink, an expected sending power of the second uplink, a maximum static power corresponding to the first uplink, a maximum static power corresponding to the second uplink, and a priority of the first uplink and a priority of the second uplink includes:

determining a first sending power as the actual sending power of the first uplink and determining a second sending power as the actual sending power of the second uplink if the priority of the first uplink is higher than the priority of the second uplink, wherein the first sending power is equal to the maximum static power corresponding to the first uplink plus a first adjustment amount, the first adjustment amount is a part or all of the dynamic adjustment amount, and the second sending power is equal to a part or all of a first power difference obtained by subtracting the first sending power from the maximum sending power of the UE.

That is, a part or all of the dynamic adjustment amount is preferentially allocated to the first uplink when the priority of the first uplink is higher than that of the second uplink. After the dynamic adjustment amount is allocated to the first uplink, if the maximum sending power of the UE is still available, a part or all of the residual sending power is allocated to the second uplink. Optionally, if there is still an uplink having a lower priority among the plurality of uplinks, after the residual sending power is allocated to the second uplink, if the maximum sending power of the UE is still available, a part or all of the residual sending power may be further allocated to other uplinks having a lower priority.

Similar to the foregoing embodiment, as an implementation, the method 200 further includes:

determining a part of the dynamic adjustment amount as the first adjustment amount if the expected sending power of the first uplink is less than a second power difference, wherein the second power difference is a power difference obtained by subtracting, from the maximum sending power of the UE, sum of maximum static powers corresponding to other uplinks among the plurality of uplinks excluding the first uplink; or determining all of the dynamic adjustment amount as the first adjustment amount if the expected sending power of the first uplink is not less than the second power difference.

That is, if all of the dynamic power adjustment amount is allocated to the first uplink, the actual sending power of the first uplink is greater than the expected sending power of the first uplink, In this case, a part of the dynamic power adjustment amount may be allocated to the first uplink; or, if all of the dynamic power adjustment amount is allocated to the first uplink, the actual sending power of the first uplink is still less than the expected sending power of the first uplink. In this case, all of the dynamic power adjustment amount may be allocated to the first uplink.

Taking an example where the plurality of uplinks include a first uplink and a second uplink, the specific implementations of Embodiment 4 are described in detail below.

Scenario 1: P1≤P1_static and P2≤P2_static

In this scenario, power control is not required, and a corresponding expected sending power is directly allocated to each downlink, i.e., P1'=P1, and P2'=P2.

Scenario 2: P1>P1_static and P2≤P2_static

In this scenario, part or all of the dynamic power adjustment amount may be allocated to the first uplink, and the expected sending power of the second uplink is allocated to the second uplink, i.e., P1'=P1_static+ΔP1, and P2'=P2, wherein ΔP1 represents a part or all of the dynamic power adjustment amount ΔP.

Optionally, if P1<P_max-P2_static, ΔP1=a*ΔP, wherein a<1; or if P1≥P_max-P2_static, ΔP1=ΔP.

Scenario 3: P1>P1_static and P2>P2_static

In this scenario, the sending power may be sequentially allocated according to the priority orders of the uplinks. Supposing the priority of the first uplink is higher than that of the second uplink, a part or all of the dynamic power adjustment amount may be preferentially allocated to the first uplink, and then a part or all of the residual sending power may be allocated to the second uplink, i.e., P1'=P1_static+ΔP1, P2'=b*(P_max−P1'), wherein ΔP1 represents a part or all of the dynamic power adjustment amount ΔP, and α≤1.

Similar to Scenario 2, if P1<P_max-P2_static, ΔP1=a*ΔP, wherein a<1; or if P1≥P_max-P2_static, ΔP1=ΔP, at this moment, P1'=P_max−P2_static.

Optionally, in some embodiments of the present disclosure, the method 200 further includes:

receiving, by the terminal device, third configuration information sent by a network device, wherein the third configuration information includes the maximum static power corresponding to the each uplink.

Similar to configuring the first configuration information and the second configuration information for the terminal device by the network device, the network device may also send third configuration information to the terminal device, and inform the terminal device of the maximum static power corresponding to the each uplink via the third configuration information.

Optionally, the network device may carry the third configuration information via an RRC message, or may include the third configuration information via DCI, and the manner of sending the third configuration information is not limited in the embodiments of the present disclosure.

Optionally, in the embodiments of the present disclosure, carrier waves corresponding to the plurality of uplinks at least partially overlap in a frequency domain.

For example, the carrier waves corresponding to the plurality of uplinks may be the same 20M bandwidth carrier wave, wherein the carrier wave may be configured by the network device for the terminal device, and the terminal device may learn the maximum transmission bandwidth of the carrier wave.

The method embodiments of the present disclosure are described in detail above with reference to FIG. 2, and apparatus embodiments of the present disclosure are described in detail below with reference to FIG. 3 to FIG. 4. It is to be understood that the apparatus embodiments and the method embodiments correspond to each other, and reference may be made to the method embodiments for a similar description.

Figure 3:
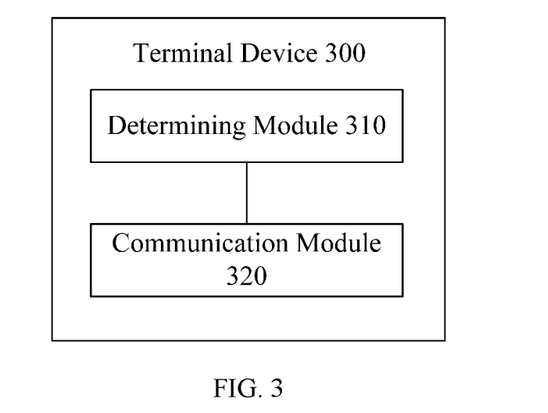
FIG. 3 is a schematic block diagram of a terminal device according to an embodiment of the present disclosure.

FIG. 3 illustrates a schematic block diagram of a terminal device 300 according to an embodiment of the present disclosure. As shown in FIG. 3, the terminal device 300 includes:

a determining module 310, configured to determine, according to an expected sending power of each uplink among a plurality of uplinks, an actual sending power of the each uplink; and a communication module 320, configured to send signal on the each uplink using the actual sending power of the each uplink.

Optionally, in some possible embodiments, the determining module 310 is specifically configured to:

determine the actual sending power of the each uplink according to the expected sending power of the each uplink and a maximum sending power of the terminal device (UE), wherein the maximum sending power of the UE is indicative of a maximum sending power available for the terminal device to simultaneously send signal on the plurality of uplinks.

Optionally, in some possible embodiments, the determining module 310 is specifically configured to:

determine a sending power obtained by multiplying the expected sending power of the each uplink by a same adjustment factor as the actual sending power of the each uplink if a sum of the expected sending power of the each uplink is greater than the maximum sending power of the UE, wherein sum of the actual sending power of the each uplink is not greater than the maximum sending power of the UE.

Optionally, in some possible embodiments, the determining module 310 is further configured to:

determine the actual sending power of the each uplink according to the expected sending power of the each uplink, the maximum sending power of the UE, and a priority of the each uplink.

Optionally, in some possible embodiments, the plurality of uplinks include a first uplink, the priority of the first uplink is higher than priorities of other uplinks, and the determining module 310 is specifically configured to:

determine an expected sending power of the first uplink as an actual sending power corresponding to the first uplink if the expected sending power of the first uplink is not greater than the maximum sending power of the UE; or determine the maximum sending power of the UE as the actual sending power corresponding to the first uplink if the expected sending power of the first uplink is greater than the maximum sending power of the UE.

Optionally, in some possible embodiments, the other uplinks include a second uplink, and the determining module 310 is further configured to:

determine a part or all of a first power difference as an actual sending power of the second uplink, or determine the actual sending power of the second uplink as zero if the expected sending power of the first uplink is not greater than the maximum sending power of the UE, wherein the first power difference is a difference value obtained by subtracting the actual sending power of the first uplink from the maximum sending power of the UE; or determine the actual sending power of the second uplink as zero if the expected sending power of the first uplink is greater than the maximum sending power of the UE.

Optionally, in some possible embodiments, the priority of the each uplink is configured by a network device or determined by the terminal device.

Optionally, in some possible embodiments, the priority of the each uplink is determined by the terminal device according to a preset rule.

Optionally, in some possible embodiments, the preset rule is indicative of determining the priority of the each uplink according to at least one of:

a data size of a downlink corresponding to the uplink, a physical uplink control channel (PUCCH) format used by the uplink, a channel type used by the uplink, a signal type of transmission of the uplink, a waveform used by the uplink, or a path loss of the uplink.

Optionally, in some possible embodiments, the communication module 320 is further configured to:

receive first configuration information sent by a network device, wherein the first configuration information is used for determining the maximum sending power of the UE.

Optionally, in some possible embodiments, the each uplink among the plurality of uplinks respectively corresponds to a corresponding maximum sending power, and the determining module 310 is specifically configured to:

determine the actual sending power of the each uplink according to the expected sending power of the each uplink, and the maximum sending power corresponding to the each uplink.

Optionally, in some possible embodiments, the plurality of uplinks includes a first uplink, and the determining module 310 is specifically configured to:

determine a first sending power as an actual sending power of the first uplink if an expected sending power of the first uplink is greater than a maximum sending power corresponding to the first uplink, wherein the first sending power is not greater than the maximum sending power corresponding to the first uplink; or determine the expected sending power of the first uplink as the actual sending power of the first uplink if the expected sending power of the first uplink is not greater than the maximum sending power corresponding to the first uplink.

Optionally, in some possible embodiments, the each uplink among the plurality of uplinks respectively corresponds to a corresponding maximum sending power, and if only a first uplink among the plurality of uplinks needs uplink transmission, the determining module 310 is further configured to:

determine a first sending power as an actual sending power of the first uplink if an expected sending power of the first uplink is greater than a maximum sending power of the UE, wherein the first sending power is not greater than the maximum sending power of the UE; or determine the expected sending power of the first uplink as the actual sending power of the first uplink if the expected sending power of the first uplink is not greater than the maximum sending power of the UE.

Optionally, in some possible embodiments, the communication module 320 is further configured to:

receive second configuration information sent by a network device, wherein the second configuration information includes the maximum sending power corresponding to the each uplink.

Optionally, in some possible embodiments, sum of the maximum sending power corresponding to the each uplink is less than or equal to the maximum sending power of the UE, and the maximum sending power of the UE is indicative of a maximum sending power available for the terminal device to simultaneously send signal on the plurality of uplinks.

Optionally, in some possible embodiments, the each uplink respectively corresponds to a corresponding maximum static power, and the determining module 310 is further configured to:

determine the actual sending power of the each uplink according to the expected sending power of the each uplink and the maximum static power corresponding to the each uplink.

Optionally, in some possible embodiments, sum of the maximum static power corresponding to the each uplink is less than the maximum sending power of the UE, a dynamic power adjustment amount is obtained by subtracting the sum of the maximum static power corresponding to the each uplink from the maximum sending power of the UE, and the dynamic power adjustment amount is used for dynamically adjusting the sending powers of the plurality of uplinks.

Optionally, in some possible embodiments, the plurality of uplinks includes a first uplink, and the determining module 310 is specifically configured to:

determine a first sending power as an actual sending power of the first uplink if an expected sending power of the first uplink is greater than a maximum static power corresponding to the first uplink, wherein the first sending power is equal to the maximum static power corresponding to the first uplink plus a first adjustment amount, and the first adjustment amount is a part or all of the dynamic power adjustment amount.

Optionally, in some possible embodiments, the determining module 310 is specifically configured to:

determine the actual sending power of the each uplink according to the expected sending power of the each uplink, the maximum static power corresponding to the each uplink, and a priority of the each uplink.

Optionally, in some possible embodiments, the priority of the each uplink is configured by a network device or determined by the terminal device.

Optionally, in some possible embodiments, the priority of the each uplink is determined by the terminal device according to a preset rule.

Optionally, in some possible embodiments, the preset rule is indicative of determining the priority of the each uplink according to at least one of:

a data size of a downlink corresponding to the uplink, a physical uplink control channel (PUCCH) format used by the uplink, a channel type used by the uplink, a signal type of transmission of the uplink, a waveform used by the uplink, or a path loss of the uplink.

Optionally, in some possible embodiments, the plurality of uplinks include a first uplink and a second uplink, and the determining module 310 is further configured to:

determine an actual sending power of the first uplink and an actual sending power of the second uplink according to an expected sending power of the first uplink, an expected sending power of the second uplink, a maximum static power corresponding to the first uplink, a maximum static power corresponding to the second uplink, and a priority of the first uplink and a priority of the second uplink if the expected sending power of the first uplink is greater than the maximum static power corresponding to the first uplink and the expected sending power of the second uplink being greater than the maximum static power corresponding to the second uplink.

Optionally, in some possible embodiments, the determining module 310 is specifically configured to:

determine a first sending power as the actual sending power of the first uplink and determine a second sending power as the actual sending power of the second uplink if the priority of the first uplink is higher than the priority of the second uplink, wherein the first sending power is equal to the maximum static power corresponding to the first uplink plus a first adjustment amount, the first adjustment amount is a part or all of the dynamic adjustment amount, and the second sending power is equal to a part or all of a first power difference obtained by subtracting the first sending power from the maximum sending power of the UE.

Optionally, in some possible embodiments, the determining module 310 is further configured to:

determine a part of the dynamic adjustment amount as the first adjustment amount if the expected sending power of the first uplink is less than a second power difference, wherein the second power difference is a power difference obtained by subtracting, from the maximum sending power of the UE, sum of maximum static powers corresponding to other uplinks among the plurality of uplinks excluding the first uplink; or determine all of the dynamic adjustment amount as the first adjustment amount if the expected sending power of the first uplink is not less than the second power difference.

Optionally, in some possible embodiments, the communication module 320 is further configured to:

receive third configuration information sent by a network device, wherein the third configuration information includes the maximum static power corresponding to the each uplink.

Optionally, in some possible embodiments, carrier waves corresponding to the plurality of uplinks at least partially overlap in a frequency domain.

It is to be understood that the terminal device 300 according to the embodiments of the present disclosure may correspond to the terminal device in the embodiments of the present disclosure, and the above and other operations and/or functions of each unit in the terminal device 300 are provided respectively to implement corresponding procedure of the method 200 as shown in FIG. 2, and their detailed descriptions are omitted here for brevity.

Figure 4:
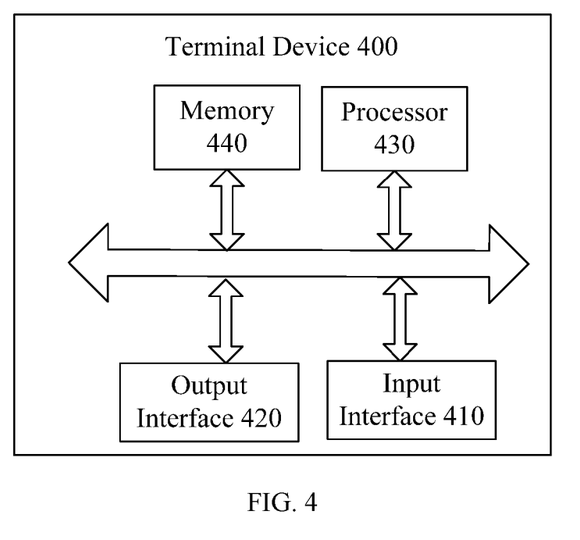
FIG. 4 is a schematic block diagram of a terminal device according to another embodiment of the present disclosure.

As shown in FIG. 4, the embodiments of the present disclosure further provide a terminal device 400, wherein the terminal device 400 may be the terminal device 300 in FIG. 3, and the terminal device 400 can be configured to execute contents of the terminal device corresponding to the method 200 in FIG. 2. The device 400 includes an input interface 410, an output interface 420, a processor 430, and a memory 440. The input interface 410, the output interface 420, the processor 430, and the memory 440 may be connected via a bus system. The memory 440 is configured to store programs, instructions or codes. The processor 430 is configured to execute the programs, the instructions or the codes in the memory 440 to control the input interface 410 to receive signal, and control the output interface 420 to send signal and complete the operations in the foregoing method embodiments.

It is to be understood that in the embodiments of the present disclosure, the processor 430 may be a central processing unit (CPU), or may be other general-purpose processor, digital signal processor (DSP), application-specific integrated circuit (ASIC), field programmable gate array (FPGA) or other programmable logic device, discrete gate or transistor logic device, or discrete hardware component, etc. The general-purpose processor may be a microprocessor, or the processor may be any conventional processor or the like.

The memory 440 may include a read-only memory (ROM) and a random access memory (RAM), and provide instructions and data to the processor 430. The memory 440 also may partly include a non-volatile random access memory. For example, the memory 440 also may store information of device type.

In an implementation process, steps of the foregoing methods may be implemented by using an integrated logic circuit of hardware in the processor 430 or an instruction in a software form. The steps of the methods disclosed in the embodiments of the present disclosure may be directly executed by a hardware processor, or may be executed by a combination of hardware and software modules in a processor. The software module may be located in a mature storage medium in the field, such as a random access memory, a flash memory, a read-only memory, a programmable read-only memory, an electrically-erasable programmable read-only memory, or a register. The storage medium is located in the memory 440, and the processor 430 reads information in the memory 440 and implements the steps of the foregoing methods in combination with the hardware of the processor 430. To avoid repetitions, detailed description is omitted herein.

In a specific implementation manner, the communication module 320 in the terminal device 300 as shown in FIG. 3 can be implemented by using the input interface 410 and the output interface 420 in FIG. 4, and the determining module 310 in the terminal device 300 as shown in FIG. 3 can be implemented by using the processor 430 in FIG. 4.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the present disclosure, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For example, multiple units or components may be combined or integrated into another system, or some features may be ignored and not executed. For another thing, intercoupling or direct coupling or communications connection displayed or discussed may be indirect coupling or communications connection, electrical or mechanical or in other forms, by means of some interfaces, apparatuses or units.

The unit serving as a detached component may be or not be physically detached, the component serving as a unit display may be or not be a physical unit, i.e., either located at one place or distributed on a plurality of network elements. Units may be selected in part or in whole according to actual needs for achieving objectives of the solution of this embodiment.

In addition, various functional units in various embodiments of the present disclosure may be integrated into one processing unit, or various units may be separately or physically existent, or two or more units may be integrated into one unit.

When the functions are implemented in the form of a software functional unit and sold or used as an independent product, the functions may be stored in a computer-readable storage medium. On the basis of such an understanding, the technical solution of the present disclosure in essence or that part of contribution to the prior art or a part of the technical solution may be embodied in the form of software products, which may be stored in a storage medium, including some instructions to cause a computer device (a personal computer, a server, a network device or the like) to execute all or a part of steps of the method as recited in the embodiments of the present disclosure. The aforementioned storage medium may include: a USB flash disk, a mobile hard disk, a read-only memory (ROM), a random access memory (RAM), a magnetic disk or an optical disk and other media capable of storing a program code.

The above-mentioned embodiments are merely specific embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the scope of protection of the present disclosure shall be subject to the scope of protection of the claims.

What is claimed is:

1. An uplink transmission method, comprising:
   determining, by a terminal device according to an expected sending power of each uplink among a plurality of uplinks, an actual sending power of the each uplink; and
   sending, by the terminal device, signal on the each uplink using the actual sending power of the each uplink,
   wherein the plurality of uplinks comprise a first uplink, a priority of the first uplink is higher than priorities of other uplinks, and the determining, by a terminal device according to an expected sending power of each uplink among a plurality of uplinks, an actual sending power of the each uplink comprises:
   determining an expected sending power of the first uplink as an actual sending power corresponding to the first uplink when the expected sending power of the first uplink is not greater than a maximum sending power of the terminal device (UE), wherein the maximum sending power of the UE is indicative of a maximum sending power available for the UE to simultaneously send signal on the plurality of uplinks; or
   determining the maximum sending power of the UE as the actual sending power corresponding to the first uplink when the expected sending power of the first uplink is greater than the maximum sending power of the UE.

2. The method according to claim 1, wherein the determining, by a terminal device according to an expected sending power of each uplink among a plurality of uplinks, an actual sending power of the each uplink further comprises:
   determining, by the terminal device, a sending power obtained by multiplying the expected sending power of the each uplink by a same adjustment factor as the actual sending power of the each uplink when a sum of the expected sending power of the each uplink is greater than the maximum sending power of the UE, wherein a sum of the actual sending power of the each uplink is not greater than the maximum sending power of the UE.

3. The method according to claim 1, wherein the other uplinks comprise a second uplink, and the determining the actual sending power of the each uplink by the terminal device according to the expected sending power of the each uplink, the maximum sending power of the UE, and a priority of the each uplink comprises:
   determining, when the expected sending power of the first uplink is not greater than the maximum sending power of the UE, an actual sending power of the second uplink as a part or all of a first power difference or as zero, wherein the first power difference is a difference value obtained by subtracting the actual sending power of the first uplink from the maximum sending power of the UE; or determining the actual sending power of the second uplink as zero when the expected sending power of the first uplink is greater than the maximum sending power of the UE.

4. The method according to claim 1, wherein the priority of the each uplink is configured by a network device or determined by the terminal device.

5. The method according to claim 4, wherein the priority of the each uplink is determined by the terminal device according to at least one of:

a data size of a downlink corresponding to the uplink, a physical uplink control channel (PUCCH) format used by the uplink, a channel type used by the uplink, a signal type of transmission of the uplink, a waveform used by the uplink, or a path loss of the uplink.

6. A terminal device, comprising:

a processor, configured to determine, according to an expected sending power of each uplink among a plurality of uplinks, an actual sending power of the each uplink; and an output interface, configured to send signal on the each uplink using the actual sending power of the each uplink, wherein the plurality of uplinks comprise a first uplink and a second uplink, and the processor is further configured to:

determine an actual sending power of the first uplink and an actual sending power of the second uplink according to an expected sending power of the first uplink, an expected sending power of the second uplink, a maximum static power corresponding to the first uplink, a maximum static power corresponding to the second uplink, a priority of the first uplink and a priority of the second uplink, when the expected sending power of the first uplink is greater than the maximum static power corresponding to the first uplink and the expected sending power of the second uplink is greater than the maximum static power corresponding to the second uplink.

7. The terminal device according to claim 6, wherein the processor is specifically configured to:

determine a first sending power as the actual sending power of the first uplink and determine a second sending power as the actual sending power of the second uplink when the priority of the first uplink is higher than the priority of the second uplink, wherein the first sending power is equal to a sum of the maximum static power corresponding to the first uplink and a first adjustment amount, the first adjustment amount is a part or all of the dynamic adjustment amount, and the second sending power is equal to a part or all of a first power difference obtained by subtracting the first sending power from the maximum sending power of the UE.

8. An uplink transmission method, comprising:

determining, by a terminal device according to an expected sending power of each uplink among a plurality of uplinks, an actual sending power of the each uplink; and sending, by the terminal device, signal on the each uplink using the actual sending power of the each uplink, wherein the each uplink among the plurality of uplinks respectively corresponds to a respective maximum sending power, the plurality of uplinks comprise a first uplink, and the determining, by a terminal device according to an expected sending power of each uplink among a plurality of uplinks, an actual sending power of the each uplink comprises:

determining, by the terminal device, a first sending power as an actual sending power of the first uplink when an expected sending power of the first uplink is greater than a maximum sending power corresponding to the first uplink, wherein the first sending power is not greater than the maximum sending power corresponding to the first uplink; or determining, by the terminal device, the expected sending power of the first uplink as the actual sending power of the first uplink when the expected sending power of the first uplink is not greater than the maximum sending power corresponding to the first uplink.

9. A terminal device, comprising:

a processor, configured to determine, according to an expected sending power of each uplink among a plurality of uplinks, an actual sending power of the each uplink; and an output interface, configured to send signal on the each uplink using the actual sending power of the each uplink, wherein the each uplink respectively corresponds to a respective maximum static power, the plurality of uplinks comprise a first uplink, and the processor is specifically configured to:

determine a first sending power as an actual sending power of the first uplink when an expected sending power of the first uplink is greater than a maximum static power corresponding to the first uplink, wherein the first sending power is equal to a sum of the maximum static power corresponding to the first uplink and a first adjustment amount, and the first adjustment amount is a part or all of the dynamic power adjustment amount.

10. The terminal device according to claim 9, wherein the each uplink among the plurality of uplinks respectively corresponds to a respective maximum sending power and, when only a first uplink among the plurality of uplinks needs uplink transmission, the processor is further configured to:

determine a first sending power as an actual sending power of the first uplink when an expected sending power of the first uplink is greater than a maximum sending power of the UE, wherein the first sending power is not greater than the maximum sending power of the UE; or determine the expected sending power of the first uplink as the actual sending power of the first uplink when the expected sending power of the first uplink is not greater than the maximum sending power of the UE.

11. The terminal device according to claim 9, wherein a sum of the maximum static power corresponding to the each uplink is less than the maximum sending power of the UE, a dynamic power adjustment amount is obtained by subtracting the sum of the maximum static power corresponding to the each uplink from the maximum sending power of the UE, and the dynamic power adjustment amount is used for dynamically adjusting the sending powers of the plurality of uplinks.

12. The terminal device according to claim 9, wherein the processor is further configured to:

determine a part of the dynamic adjustment amount as the first adjustment amount when the expected sending power of the first uplink is less than a second power difference, wherein the second power difference is a power difference obtained by subtracting, from the maximum sending power of the UE, a sum of maximum static powers corresponding to uplinks among the plurality of uplinks other than the first uplink; or determine all of the dynamic adjustment amount as the first adjustment amount when the expected sending power of the first uplink is not less than the second power difference.

13. The terminal device according to claim 9, wherein carrier waves corresponding to the plurality of uplinks at least partially overlap in a frequency domain.

* * * * *